United States Patent
Hrabak et al.

(10) Patent No.: US 7,418,318 B2
(45) Date of Patent: Aug. 26, 2008

(54) METHOD AND HUD SYSTEM FOR DISPLAYING UNUSUAL ATTITUDE

(75) Inventors: Ronald R. Hrabak, Glendale, AZ (US); Patrick Bain, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 158 days.

(21) Appl. No.: 11/114,269

(22) Filed: Apr. 25, 2005

(65) Prior Publication Data

US 2006/0241821 A1    Oct. 26, 2006

(51) Int. Cl.
   *G01C 23/00*    (2006.01)
(52) U.S. Cl. .................. 701/3; 340/945; 340/974; 340/967; 340/971; 345/7; 345/133
(58) Field of Classification Search .............. 701/3; 340/945, 980, 974, 419, 967, 971; 345/419, 345/7, 133, 418; 382/276; 250/330
   See application file for complete search history.

(56) References Cited

U.S. PATENT DOCUMENTS

| | | | |
|---|---|---|---|
| 5,185,606 A * | 2/1993 | Verbaarschot et al. ....... 340/961 |
| 5,198,812 A | 3/1993 | Probert |
| 5,289,185 A * | 2/1994 | Ramier et al. ............... 340/971 |
| 5,420,582 A * | 5/1995 | Kubbat et al. ............... 340/974 |
| 6,121,899 A * | 9/2000 | Theriault .................... 340/967 |
| 6,173,220 B1 * | 1/2001 | Schmitt ........................ 701/4 |
| 6,272,404 B1 * | 8/2001 | Amano et al. ................. 701/3 |
| 6,405,107 B1 * | 6/2002 | Derman ......................... 701/3 |

(Continued)

OTHER PUBLICATIONS

Burch, D.P., Braasch, M.S, "Enhanced Head-Up Display for General Aviation aircraft", Digital Avionics Systems Conference, 2002. Proceedings. The 21st, vol. 2, 2002 pp. 11C6-1-11C6-11 vol. 2☐☐.*

(Continued)

*Primary Examiner*—Tuan C To
(74) *Attorney, Agent, or Firm*—Ingrassia, Fisher & Lorenz, P.C.

(57) ABSTRACT

Methods and systems are provided for displaying an unusual attitude of an aircraft in a head-up display system. The system comprises a projection unit configured to project the unusual attitude of the aircraft and a processor coupled to the LCD projection unit. The processor is configured to control the LCD projection unit during the unusual attitude of the aircraft to produce an attitude indicator of the aircraft and a horizon symbol. The horizon symbol divides the attitude indicator into a first region having a first display characteristic and a second region having a second display characteristic different from the first display characteristic. The first display characteristic is substantially uniform throughout the first region, and the first region indicates a ground with respect to the aircraft.

16 Claims, 2 Drawing Sheets

U.S. PATENT DOCUMENTS

| | | | |
|---|---|---|---|
| 6,437,759 B1 * | 8/2002 | Turner et al. | 345/8 |
| 6,489,898 B1 * | 12/2002 | Nicholls | 340/975 |
| 6,567,014 B1 * | 5/2003 | Hansen et al. | 340/980 |
| 6,686,850 B2 * | 2/2004 | Hausmann | 340/967 |
| 6,686,851 B1 * | 2/2004 | Gordon et al. | 340/970 |
| 6,693,559 B1 * | 2/2004 | Gyde et al. | 340/974 |
| 6,946,976 B1 * | 9/2005 | Langner et al. | 340/971 |
| 6,972,696 B2 * | 12/2005 | Rogers et al. | 340/971 |
| 7,280,896 B2 * | 10/2007 | Morizet et al. | 701/3 |
| 2006/0066459 A1 * | 3/2006 | Burch et al. | 340/980 |

OTHER PUBLICATIONS

PCT International Search Report PCT/US2006/015097, filed Aug. 3, 2006.

J. Reising, J. Zenyuh, K. Barthelemy, Head-Up Display Symbology For Unusual Attitude Recovery, Proceedings of the IEEE 1988 National: Aerospace And Electronics Conference, May 23, 1988, pp. 926-930, Flight Dynamics Laboratory, Wright-Patterson AFB, OH.

* cited by examiner

METHOD AND HUD SYSTEM FOR DISPLAYING UNUSUAL ATTITUDE

FIELD OF THE INVENTION

The present invention generally relates to aircraft display systems, and more particularly relates to head-up display systems and methods for displaying attitude information on a head-up display.

BACKGROUND OF THE INVENTION

A variety of display systems have been devised to present aircraft and flight information, such as pitch and roll attitude, altitude, airspeed, heading, and the like, to the pilot. These display systems typically use a combination of alphanumeric and graphical information to indicate the state of the aircraft on a single display. Two general categories of aircraft display systems commonly found in commercial, military, and civilian aircraft include a panel-mounted variety (e.g., a Head-Down Display or HDD) and a Head-Up Display (HUD) variety.

In general, a greater degree of information may be presented on a panel-mounted aircraft display than a HUD. A HUD typically projects flight information onto a combiner located within the general viewing area (e.g., the cockpit window) of the aircraft pilot, and the amount of flight information provided onto the combiner is generally limited to permit simultaneous viewing of the flight information and the environment seen beyond the cockpit window. Additionally, many conventional HUD systems are monochromatic because some colors provide greater viewing performance than other colors and because multi-colored Cathode Ray Tube (CRT) projectors used in such HUD systems generally process flight information at a rate unsuitable for real-time performance. Without concern for viewing of the environment beyond the cockpit window, panel-mounted aircraft displays generally lack these constraints and can provide multi-colored presentations with greater information detail than conventional HUD displays.

One display instrument presented in these display systems is an Attitude Direction Indicator (ADI). An ADI generally indicates a reference point or line, e.g., a horizon line, relative to the position of an aircraft. The aircraft may be represented by a fixed element of the ADI display, and most ADIs depict the aircraft wings as one or more horizontal marks that are centered with respect to the display screen. The horizon line rendered on the ADI display may move up and down to reflect pitch changes of the aircraft. Similarly, the horizon line may rotate to reflect roll changes of the aircraft.

Some conventional ADIs used in HDDs include a blue colored region above the horizon line (e.g., representing the sky) and a brown or tan colored region below the horizon line (e.g., representing the Earth or ground). This color scheme is particularly useful when the pilot attempts to visually ascertain the relative position of the aircraft (e.g., with respect to the ground) within a short time period because the two colors more clearly distinguish the sky from the ground. While an ADI having such a color scheme may be suitable in many HDDs, most conventional HUDs, such as those employing CRT projectors, lack a multi-colored depiction of the regions above and below the horizon line. Under normal circumstances, a conventional HUD uses a pitch ladder and a roll scale, instead of the conventional ADI, and thus lacks features to distinguish the sky from the ground.

Distinguishing the sky from the ground is particularly useful during the occurrence of an upset condition. An upset condition may occur when the aircraft has an unusual attitude (e.g., an attitude promoting aircraft stall) that requires an eventual recovery from the unusual attitude. When the aircraft is oriented such that either all sky or all ground would be displayed, the conventional ADI used in HDDs presents some of both the sky and ground to minimize the pilot workload in ascertaining which direction to direct the aircraft for recovery.

Accordingly, it is desirable to provide an aircraft HUD system having a display that maintains both a sky region and a ground region and differentiates the sky region from the ground regions within the ADI during an upset condition. In addition, it is desirable to provide a method for displaying an ADI in an aircraft HUD system that maintains both a sky region and a ground region within the ADI and differentiates the sky region from the ground region within the ADI during an upset condition. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A head-up display (HUD) system is provided for displaying an unusual attitude of an aircraft. The HUD system comprises a projection unit configured to project the unusual attitude of the aircraft and a processor coupled to the LCD projection unit. The processor is configured to control the LCD projection unit during the unusual attitude of the aircraft to produce an attitude indicator of the aircraft and a horizon symbol. The horizon symbol divides the attitude indicator into a first region having a first display characteristic and a second region having a second display characteristic different from the first display characteristic. The first display characteristic is substantially uniform throughout the first region, and the first region indicates a ground with respect to the aircraft.

A method is provided for displaying an unusual attitude of an aircraft on a head-up display. The method comprises the steps of projecting a flight environment, overlaying an attitude indicator onto the flight environment, and manipulating the flight environment within the attitude indicator to indicate the unusual attitude of the aircraft. The flight environment comprises a first region having a first substantially uniform display characteristic, a second region having a second display characteristic different from the first substantially uniform display characteristic, and a horizon line separating the first region from the second region. The first region indicates a ground. The flight environment is manipulated within the attitude indicator while retaining at least 10% of either region within the attitude indicator.

In another exemplary embodiment, a HUD system is provided for displaying an unusual attitude of an aircraft. The HUD system comprises a combiner, an LCD projection unit configured to project the unusual attitude of the aircraft onto the combiner, and a processor coupled to the LCD projection unit. The processor is configured to control the LCD projection unit during the unusual attitude of the aircraft to produce an attitude indicator of the aircraft having a field of view and a horizon symbol dividing the field of view into first and second regions. The first region has a first substantially uniform display characteristic. The second region has a second substantially uniform display characteristic different from the first display characteristic. The first region indicates ground with respect to the aircraft.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

In general, a Head-Up Display (HUD) system is provided comprising a projection unit configured to project the unusual attitude of the aircraft and a processor coupled to the LCD projection unit. The processor is configured to control the LCD projection unit during the unusual attitude of the aircraft to produce an attitude indicator of the aircraft and a horizon symbol. The horizon symbol divides the attitude indicator into a first region having a first display characteristic and a second region having a second display characteristic different from the first display characteristic. The first display characteristic is substantially uniform throughout the first region, and the first region indicates a ground with respect to the aircraft.

Figure 1:
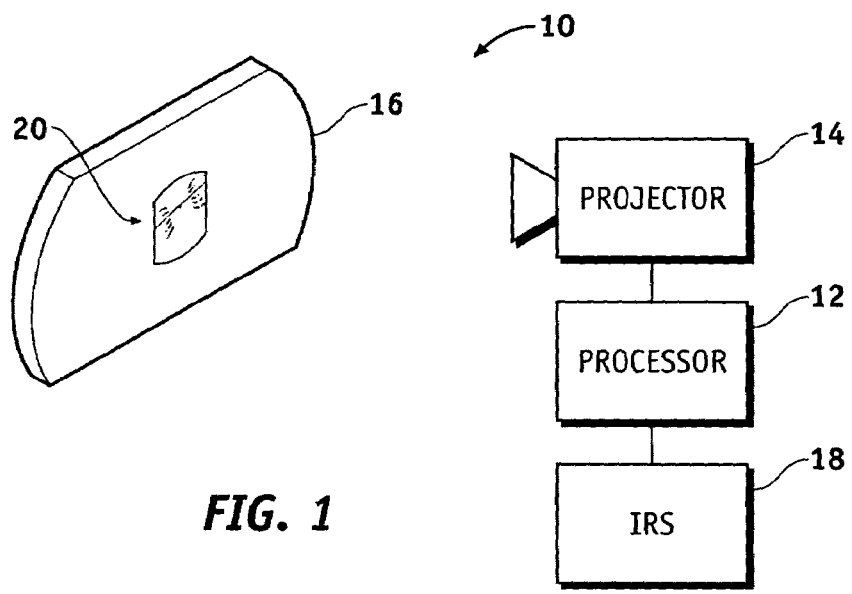
FIG. 1 is a schematic diagram of an aircraft head-up display system in accordance with an exemplary embodiment of the present invention.

Referring to the drawings, FIG. 1 a schematic diagram of an aircraft HUD system 10 in accordance with an exemplary embodiment of the present invention. The HUD system 10 comprises a processor 12, a projector 14 (e.g., a color Liquid Crystal Display (LCD) projection unit) coupled to the processor 12, a combiner 16 for receiving the images projected by the projector 14, and an Inertial Reference System (IRS) 18 coupled to the processor 12. The processor 12 determines a flight environment or terrain, such as simulating the view through the cockpit window of the aircraft and in front of the nose of the aircraft, based on flight information data regarding the aircraft provided by the IRS 18 and modifies the flight environment when the aircraft is oriented in an unusual attitude. An unusual attitude refers to a pre-determined aircraft attitude that requires an eventual recovery of the aircraft from such pre-determined aircraft attitude. The processor 12 instructs the projector 12 to display an Attitude Direction Indicator (ADI) 20 onto the combiner 16 using the modified flight environment.

The processor 12 receives and processes information associated with the position and/or attitude of the aircraft relative to one or more reference locations, points, planes, or targets, such as, for example, an angle of ascent or descent of the aircraft. This attitude information may be provided by the IRS 18 or from other systems or processing units on the aircraft such as, for example, a global positioning system, an air data computer, memories, storage devices, interface cards, and other standard components known in the art. The processor 12 includes any number of microprocessor elements, memory elements, power supplies, and other functional components to support the operation of the HUD system 10. In this respect, the processor 12 may include or cooperate with any number of software programs or instructions that perform various methods, process tasks, calculations, and control functions to generate display signals and other data used to display the ADI 12.

In an exemplary embodiment, the IRS 18 provides attitude data to the processor 12 and includes, but is not necessarily limited to, the pitch of the aircraft relative to a reference point or plane (e.g., a horizon), or the roll of the aircraft relative to the longitudinal axis traversing the fuselage of the aircraft. The IRS 18 may include a variety of detection elements that utilize common techniques and commercially available components for generating the position and orientation data of the aircraft, and a pre-set aircraft attitude may be incorporated into the HUD system 10 for indicating when unusual attitude is active.

While the processor 12 receives the attitude data, control of the HUD system 10 during an unusual attitude may be implemented, for example, as software instructions from the processor 12 to the projector 14. The projector 14 is preferably a color LCD type projection unit (e.g., green monochromatic LCD display) that images a variety of symbology onto the combiner 16 in pre-determined color formats (e.g., green format), patterns, shading, and the like, in response to instructions from the processor 12. The combiner 16 has a conventional lens for capturing the images projected by the projector 14, such as used in a variety of conventional aircraft HUD systems. In comparison with conventional Cathode Ray Tube (CRT) displays that have limited image processing rates for HUD applications, the LCD projection unit 14 generally processes more instructions from the processor 12 which enables more complete imaging of the ADI 16 onto the combiner 16.

Figure 2:
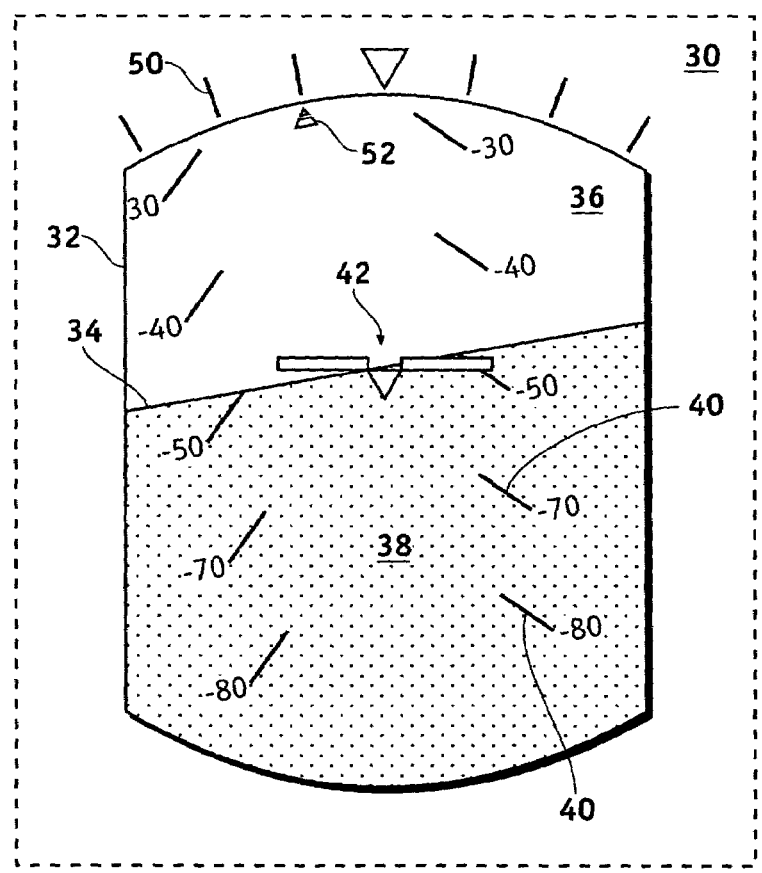
FIG. 2 illustrates a head-up display displaying an attitude direction indicator during an unusual attitude in accordance with an exemplary embodiment of the present invention.

FIG. 2 illustrates a HUD 30 displaying an ADI 32 during an unusual attitude in accordance with an exemplary embodiment of the present invention. Generally, the ADI 32 is a pictorial representation of the aircraft pitch and roll attitudes. Within a field of view of the ADI 32, the ADI 32 comprises a first region 38 indicating the ground, for example, with respect to the aircraft, a second region 36 indicating the sky, for example, with respect to the aircraft, and a horizon line 34 indicating the separation between the first and second regions 38, 36. The first region 38 has a substantially uniform display characteristic such as a uniform pattern, shading, color (e.g., green), and the like. To distinguish the second region 36 from the first region 38, the second region 36 may remain without imaging from the LCD projection unit 14 or, alternatively, may have a display characteristic noticeably different from the first region 38. For example, the second region 36 may have a pattern, shading, color, and the like, that is different from the display characteristic of the first region 38.

The ADI 32 may further comprise an aircraft reference symbol 42, a pitch ladder 40, and roll indices 50, or a roll scale, to assist in identifying the attitude of the aircraft with respect to the horizon line 34. The aircraft reference symbol 42 may depict the aircraft wings as one or more horizontal marks. With respect to the horizon line 34 rendered on the display HUD 30, the aircraft reference symbol indexes changes in the pitch of the aircraft, and the horizon line 34 rotates in response to changes in the roll of the aircraft. The pitch ladder 40 includes a vertical scale having markers that indicate the aircraft pitch attitude with respect to a horizontal plane. The markers may be angled with respect to the horizon line 34 such that markers indicating greater pitch attitudes are progressively angled more with respect to the horizon line 34. For example, the markers indicating −70 degrees pitch attitude are angled more from the horizon line 34 than the markers indicating −30 degrees pitch attitude. A roll angle pointer 52 is also included to indicate the roll attitude of the aircraft with respect to the roll scale 50 comprised of fixed markers. Changes in roll attitude are also indicated by a rotation of the horizon line 34.

When the aircraft attitude reaches the unusual attitude, such as determined by the processor 12 (FIG. 1) from a comparison with the pre-set aircraft attitude, the processor 12 instructs the LCD projection unit 14 (FIG. 1) to project a modified image of the regions 38, 36 and the horizon line 34 such that at least twenty percent (20%), and preferably at least ten percent (10%), of each of the regions 38, 36 remains within the ADI 32 while indicating the unusual attitude. For example, in the event that the aircraft has an attitude that coincides with a stall attitude, the processor 12 recognizes the unusual attitude, extrapolates the field of view of the ADI 32 to the nearest orientation of the ground, and instructs the LCD projection unit 14 (FIG. 1) to project at least ten percent (10%) of the ground (i.e., the first region) within the ADI 32 when most conventional HUD systems typically lack any indication of the ground. By noticeably distinguishing the first region 38 from the second region 36 through differences in display characteristics (e.g., different patterns, shading, and the like) and retaining a percentage of each of the regions 38, 36 within the ADI 32, a more rapid and simpler determination may be made of the flight input for recovery from the unusual attitude.

Figure 3:
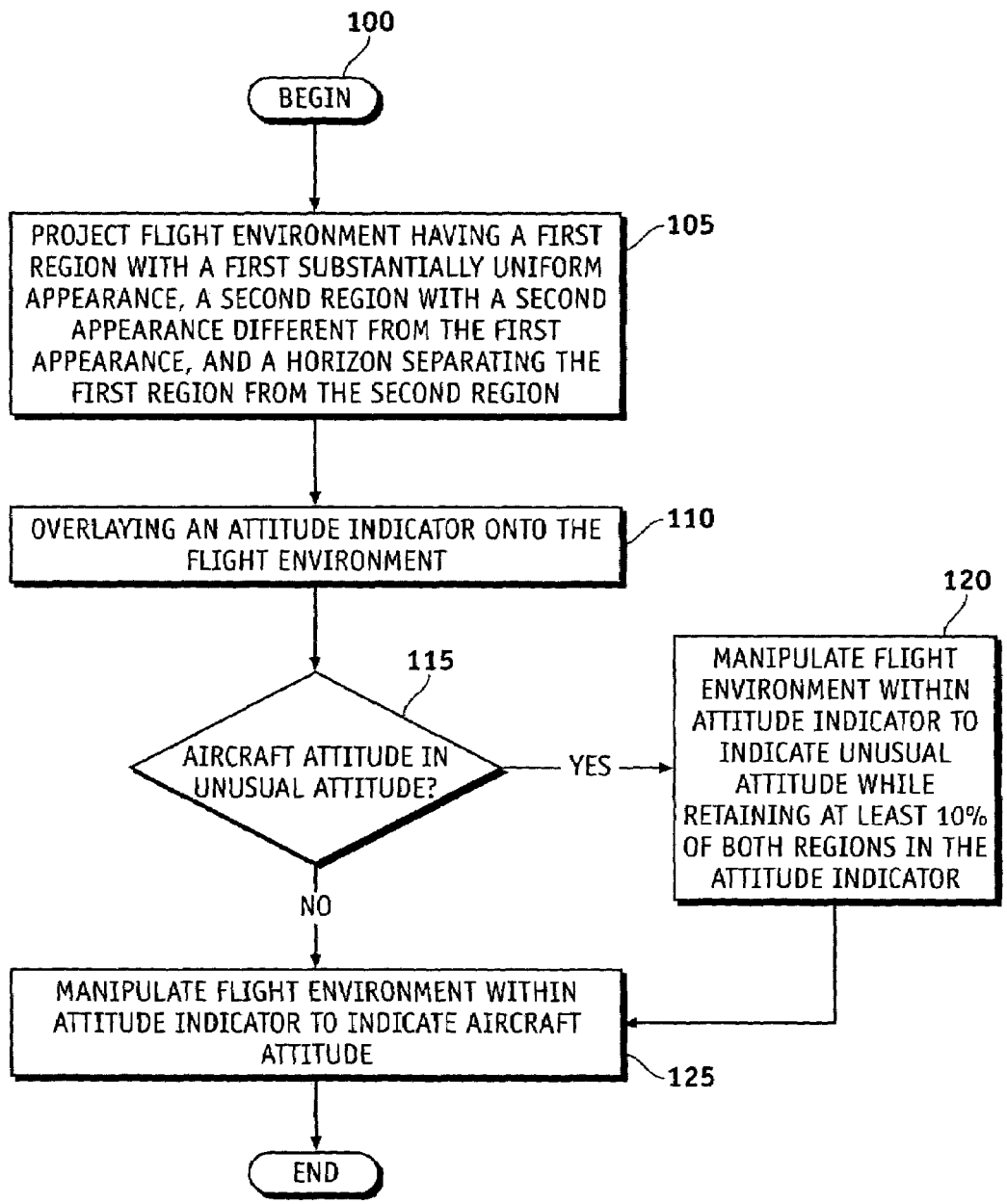
FIG. 3 is a flow chart showing a method for displaying an unusual attitude of an aircraft in accordance with an exemplary embodiment of the present invention.

FIG. 3 is a flow chart showing a method for displaying an unusual attitude of an aircraft in accordance with an exemplary embodiment of the present invention. The method begins at 100. The LCD projection unit 14 (FIG. 1) projects a flight environment having a first region 38 (FIG. 2), a second region 36 (FIG. 2), and a horizon line 34 (FIG. 2) separating the first and second regions 38, 36 (FIG. 2) on the combiner 16 (FIG. 1) at step 105. The first region 38 (FIG. 2) has a substantially uniform display characteristic. The second region 36 (FIG. 2) has a display characteristic noticeably different from the display characteristic of the first region 38 (FIG. 2). In one embodiment, the LCD projection unit 14 (FIG. 1) projects the first region 38 (FIG. 2) with a first color and the second region 36 (FIG. 2) with no color or with a second color different from the first color. In another embodiment, the LCD projection unit 14 (FIG. 1) projects the first region 38 (FIG. 2) with a first pattern and the second region 36 (FIG. 2) with no pattern or with a second pattern different from the first pattern. In yet another embodiment, the LCD projection unit 14 (FIG. 1) projects the first region 38 (FIG. 2) with a first shading and the second region 36 (FIG. 2) with no shading or with a second shading different from the first color.

The LCD projection unit 14 (FIG. 1) overlays an attitude indicator 32 (FIG. 2) onto the flight environment at step 110. In one embodiment, the LCD projection unit 14 (FIG. 1) overlays an aircraft reference symbol 42 (FIG. 2) within the attitude indicator 32 (FIG. 2) and a pitch ladder 40 (FIG. 2) within the attitude indicator 32 with respect to the aircraft reference symbol 42. In this embodiment, the aircraft reference symbol 42 (FIG. 2) is laterally centered with respect to the attitude indicator 32 (FIG. 2). The pitch ladder 40 (FIG. 2) comprises a plurality of pitch lines, and each of the pitch lines indicates a pitch angle. Additionally, the LCD projection unit 14 (FIG. 1) may overlay each of the pitch lines at a line angle with respect to the horizon line 34 such that the line angles of the pitch lines progressively increase as the corresponding pitch angles increase.

The processor 12 (FIG. 1) determines if the aircraft attitude is an unusual attitude at step 115. In the event that the aircraft attitude is an unusual attitude, the processor 12 (FIG. 1) manipulates the flight environment such that the LCD projection unit 14 (FIG. 1) displays the flight environment within the attitude indicator to the unusual attitude while maintaining at least ten percent (10%) of each of the region 38, 36 (FIG. 2) within the attitude indicator at step 120. In the event the aircraft attitude is not an unusual attitude, the processor 12 (FIG. 1) manipulates the flight environment such that the LCD projection unit 14 (FIG. 1) displays the flight environment within the attitude indicator to indicate the aircraft attitude at step 125. In one embodiment, the processor 12 (FIG. 1) scales the first region 38 (FIG. 2), the second region 36 (FIG. 2), and the horizon line 34 (FIG. 2) within the attitude indicator 32 (FIG. 2) to retain at least ten percent (10%) of each of the regions 38, 36 within the attitude indicator 32 during the unusual attitude of the aircraft.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A head-up display (HUD) system for displaying an attitude of an aircraft, comprising:
   a projection unit configured to project a flight environment; and
   a processor coupled to the projection unit and configured to:
   generate the flight environment, including a horizon symbol dividing the attitude indicator into a first region indicating the ground with respect to the aircraft and a second region indicating the sky with respect to the aircraft,
   overlay an attitude indicator onto the flight environment, and
   manipulate the flight environment associated with the attitude indicator to indicate the attitude of the aircraft while retaining at least 20% of each of the first region and second region irrespective of an actual attitude of the aircraft.

2. The HUD system according to claim 1, wherein the processor is further configured to display a first pattern as the first region and a second, differing pattern as the second region.

3. The HUD system according to claim 1, wherein the processor is further configured to display a first shading as the first region and a second, differing shading as the second region.

4. The HUD system according to claim 1, wherein the processor is further configured to display a first color as the first region and a second, differing color as the second region.

5. The HUD system according to claim 1, wherein the processor is further configured to generate:
   an aircraft reference symbol laterally centered in the attitude indicator for indicating an orientation of the aircraft, and
   a pitch ladder symbol positioned in the attitude indicator with respect to the aircraft reference symbol, the pitch ladder symbol comprising a plurality of pitch lines, each of the plurality of pitch lines indicating a pitch angle.

6. The HUD system according to claim 5, wherein each of the plurality of pitch lines is positioned at a line angle with respect to the horizon symbol, the line angles of said plurality of pitch lines progressively increasing as the pitch angles increase.

7. The HUD system according to claim 1, wherein the projection unit comprises a Liquid Crystal Display (LCD).

8. The HUD system according to claim 4, wherein the first color is a green monochromatic color.

9. A head-up display (HUD) system for displaying an attitude of an aircraft, comprising:
 a combiner;
 a projection unit configured to project a flight environment; and
 a processor coupled to the projection unit and configured to:
  generate the flight environment, including a horizon symbol dividing the attitude indicator into a first region indicating the ground with respect to the aircraft and a second region indicating the sky with respect to the aircraft,
  overlay an attitude indicator onto the flight environment, and
  manipulate the flight environment associated with the attitude indicator to indicate the attitude of the aircraft while retaining at least 20% of each of the first region and second region irrespective of an actual attitude of the aircraft.

10. The HUD system according to claim 9, wherein the processor is further configured to display a first pattern as the first region and a second, differing pattern as the second region.

11. The HUD system according to claim 9, wherein the processor is further configured to display a first shading as the first region and a second, differing shading as the second region.

12. The HUD system according to claim 9, wherein the processor is further configured to display a first color as the first region and a second, differing color as the second region.

13. The HUD system according to claim 9, wherein the processor is further configured to generate:
 an aircraft reference symbol laterally centered in the attitude indicator for indicating an orientation of the aircraft, and
 a pitch ladder symbol positioned in the attitude indicator with respect to the aircraft reference symbol, the pitch ladder symbol comprising a plurality of pitch lines, each of the plurality of pitch lines indicating a pitch angle.

14. The HUD system according to claim 13, wherein each of the plurality of pitch lines is positioned at a line angle with respect to the horizon symbol, the line angles of the plurality of pitch lines progressively increasing as the pitch angles increase.

15. The HUD system according to claim 9, wherein the projection unit comprises a Liquid Crystal Display (LCD).

16. The HUD system according to claim 12, wherein the first color is a green monochromatic color.

* * * * *